(12) United States Patent
Schmalzl (10) Patent No.: US 12,066,565 B2
(45) Date of Patent: Aug. 20, 2024

(54) RADAR SYSTEM WITH BALANCING OF THE RECEIVING CHANNELS OVER A PLURALITY OF RADAR CHIPS

(71) Applicant: Infineon Technologies AG, Neubiberg (DE)

(72) Inventor: Stefan Helmut Schmalzl, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 253 days.

(21) Appl. No.: 17/223,742

(22) Filed: Apr. 6, 2021

(65) Prior Publication Data

US 2021/0311164 A1    Oct. 7, 2021

(30) Foreign Application Priority Data

Apr. 7, 2020   (DE) .......................... 102020109611.9

(51) Int. Cl.
   *G01S 7/35*   (2006.01)
   *G01S 7/03*   (2006.01)

(52) U.S. Cl.
   CPC ................. *G01S 7/352* (2013.01); *G01S 7/03* (2013.01)

(58) Field of Classification Search
   CPC .......... G01S 7/352; G01S 7/03; G01S 13/931; G01S 7/4021; G01S 13/584; G01S 13/87; G01S 7/4056
   See application file for complete search history.

(56) References Cited

U.S. PATENT DOCUMENTS 6,054,948 A * 4/2000 Dean ....................... G01S 7/032
                                                    342/372
6,313,781 B1 * 11/2001 Lee ........................ G01S 7/021
                                                    342/417

(Continued)

FOREIGN PATENT DOCUMENTS

CN    109375182 A  *  2/2019
DE    102018206701 A1 * 11/2019 ............. G01R 29/26

OTHER PUBLICATIONS

CN109375182A_Description_20221212_1405.pdf (translation of CN109375182A) (Year: 2019).*

(Continued)

*Primary Examiner* — Olumide Ajibade Akonai
*Assistant Examiner* — Yonghong Li
(74) *Attorney, Agent, or Firm* — Harrity & Harrity, LLP (57) ABSTRACT

A radar system includes a first radar chip having one or more receiving channels and a second radar chip having one or more receiving channels, wherein the receiving channels of the first and second radar chips each have an RF input port and are configured to provide, based on an RF input signal received at the RF input port, a corresponding digital baseband signal that is characterizable by at least one signal parameter. The radar system further includes a power divider configured to forward an RF signal to both a first receiving channel integrated in the first radar chip and to a second receiving channel integrated in the second radar chip. A processor is configured to determine information indicating a deviation between the signal parameter of the digital baseband signal of the first receiving channel and the corresponding signal parameter of the digital baseband signal of the second receiving channel.

20 Claims, 8 Drawing Sheets

(56) References Cited

U.S. PATENT DOCUMENTS

| | | | |
|---|---|---|---|
| 11,054,500 B2* | 7/2021 | Sreekiran | H01Q 1/3233 |
| 2012/0088464 A1* | 4/2012 | Dehlink | G01S 7/4021 |
| | | | 455/255 |
| 2016/0033625 A1 | 2/2016 | Floyd et al. | |
| 2020/0003862 A1* | 1/2020 | Doaré | H03M 1/1245 |
| 2020/0292666 A1* | 9/2020 | Maher | G01S 7/354 |
| 2021/0072349 A1* | 3/2021 | Mayer | G01S 13/87 |

OTHER PUBLICATIONS

"Fast Fourier transform—Wikipedia.pdf" from https://web.archive.org/web/20171123075052/https://en.wikipedia.org/wiki/Fast_Fourier_transform (Year: 2017).*

"Power dividers and directional couplers—Wikipedia.pdf" from https://web.archive.org/web/20190619153558/http://en.wikipedia.org:80/wiki/Power_dividers_and_directional_couplers (Year: 2019).*

"Baseband—Wikipedia.pdf" from https://web.archive.org/web/20190620210552/http://en.wikipedia.org/wiki/Baseband (Year: 2019).*

DE102018206701A1_translate.pdf—translation of DE102018206701A1 (Year: 2019).*

* cited by examiner

RADAR SYSTEM WITH BALANCING OF THE RECEIVING CHANNELS OVER A PLURALITY OF RADAR CHIPS

RELATED APPLICATION

This application claims priority to German Patent Application No. 102020109611.9, filed on Apr. 7, 2020, which is incorporated herein by reference in its entirety.

FIELD

The present description relates to the field of radar sensors, and, in particular, to a radar system having a plurality of radar chips.

BACKGROUND

Radar sensors are used in a multiplicity of applications for detecting objects, wherein the detecting usually comprises measuring distances and speeds of the detected objects. In the automotive field, in particular, there is an increasing need for radar sensors which can be used, inter alia, in driving assistance systems (Advanced driver assistance systems, ADAS) such as e.g. in cruise control (ACC, Adaptive Cruise Control, or Radar Cruise Control) systems. Such systems can automatically adapt the speed of an automobile in order thus to maintain a safe distance from other automobiles ahead (and also other objects and pedestrians). Further applications in the automotive field are, e.g., blind spot detection, lane change assist and the like. In the field of autonomous driving, radar sensors and systems having a plurality of sensors will play an important part for the control of autonomous vehicles.

Modern integrated radar systems usually comprise a multiplicity of transmitting and receiving channels in order to enable a high angular resolution during the detection of objects in the field of view of the radar system (radar target) by means of beamforming techniques. The phases of the received radar signals play a part for determining the azimuth angle of a detected object, and the phase shifts caused in the different receiving channels that can be integrated in different radar chips are therefore also relevant.

Therefore, it may be desirable to provide a radar system in which different phase shifts in different receiving channels are balanced.

SUMMARY

Embodiments relate to radar systems and methods in which different phase shifts in different receiving channels are balanced.

In accordance with one example embodiment, the radar system includes a first radar chip having one or more receiving channels and a second radar chip having one or more receiving channels, wherein the receiving channels of the first radar chip and of the second radar chip each have an RF input port and are configured to provide, based on an RF input signal received at the RF input port, a corresponding digital baseband signal that is characterizable by at least one signal parameter. The radar system further includes a power divider configured to forward an RF signal both to a first receiving channel integrated in the first radar chip and to a second receiving channel integrated in the second radar chip. The radar system furthermore includes a computing unit configured to determine information indicating a deviation between the signal parameter of the digital baseband signal of the first receiving channel and the corresponding signal parameter of the digital baseband signal of the second receiving channel.

In accordance with a further example embodiment, the radar system includes a first radar chip having one or more receiving channels and a second radar chip having one or more receiving channels, wherein the receiving channels of the first radar chip and of the second radar chip each have an RF input port and are configured to provide, based on an RF signal received at the respective RF input port, a corresponding digital baseband signal. The system further includes a first antenna configured to provide an antenna signal, and a power divider coupled to the first antenna and configured to forward an antenna signal both to a first receiving channel integrated in the first radar chip and to a second receiving channel integrated in the second radar chip.

Furthermore, a method for a radar application is described. In accordance with one example embodiment, the method includes generating digital baseband signals in a multiplicity of receiving channels of a radar system based on RF input signals fed to the input ports of the receiving channels. The same RF signal is fed as RF input signal to a first receiving channel integrated in a first radar chip and to a second receiving channel integrated in a second radar chip, and the digital baseband signals are each characterizable by at least one signal parameter. The method further includes determining information relating to a deviation between the signal parameter of the digital baseband signal of the first receiving channel and the corresponding signal parameter of the digital baseband signal of the second receiving channel.

BRIEF DESCRIPTION OF THE DRAWINGS

Example embodiments are explained in greater detail below with reference to figures. The illustrations are not necessarily true to scale and the example embodiments are not restricted only to the aspects illustrated. Rather, importance is attached to illustrating the principles underlying the example embodiments. In the figures.

DETAILED DESCRIPTION

Figures 1, 2:
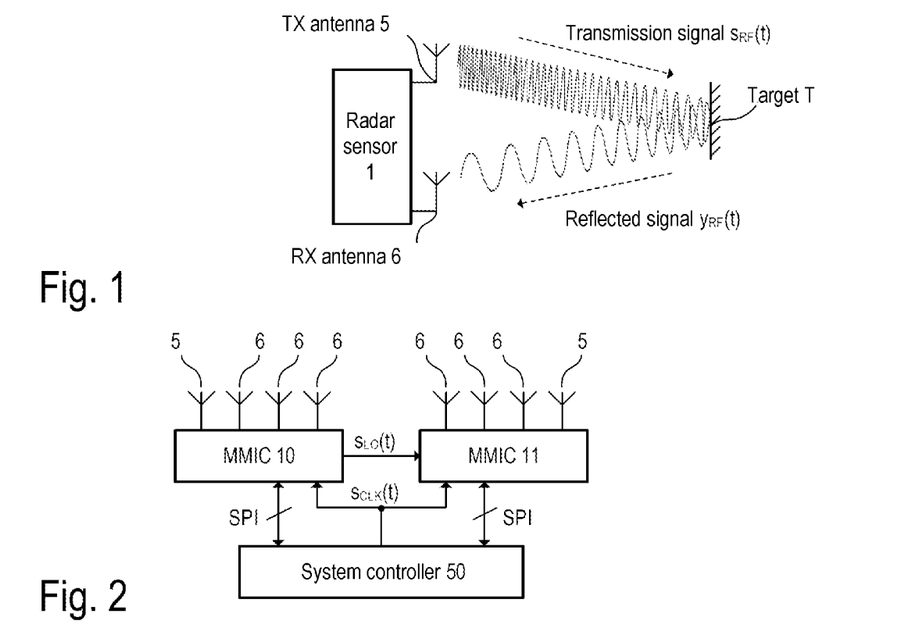
FIG. 1 is a schematic diagram for illustrating the functional principle of an FMCW radar system for distance and/or speed measurement.
FIG. 2 shows an example for illustrating the basic structure of a radar system constructed from a plurality of radar chips.

FIG. 1 illustrates, in a schematic diagram, the application of a frequency-modulated continuous-wave radar system— usually referred to as FMCW radar system—as sensor for the measurement of distances and speeds of objects, which are usually referred to as radar targets. However, it is important to emphasize that this is only one example and the concepts described here are not restricted to FMCW radar systems. Inter alia, the concepts described here can also be applied to phase-modulated continuous-wave (PMCW) radar systems, to radar systems that use pulse compression techniques, etc.

In the present example from FIG. 1, the radar device 1 comprises separate transmitting (TX) and receiving (RX) antennas 5 and 6 respectively (bistatic or pseudo-monostatic radar configuration). It should be noted, however, that a single antenna can also be used, which serves simultaneously as transmitting antenna and as receiving antenna (monostatic radar configuration). The transmitting antenna 5 emits a continuous RF signal $S_{RF}(t)$, which is frequency-modulated for example with a type of sawtooth signal (periodic, linear frequency ramp). The emitted signal $S_{RF}(t)$ is backscattered at the radar target T and the backscattered/reflected signal $y_{RF}(t)$ (echo signal) is received by the receiving antenna 6. FIG. 1 shows a simplified example; in practice, radar sensors are systems having a plurality of transmitting (TX) and receiving (RX) channels in order also to be able to ascertain the angle of incidence (Direction of Arrival, DoA) of the backscattered/reflected signal $y_{RF}(t)$ and thus to be able to localize the radar target T more accurately.

FIG. 2 is a block diagram which illustrates by way of example one possible structure of a radar system 1 (radar sensor) comprising a plurality of radar chips, which are also referred to as monolithically microwave integrated chips (MMICs). In the present example, the radar system comprises two MMICs 10 and 11. In other examples, the radar system can comprise three or more MMICs. Each of the MMICs comprises one or more transmitting (TX) channels and one or more receiving (RX) channels, which are coupled respectively to transmitting antennas 5 and receiving antennas 6. In the present example, each MMIC has in each case one TX channel and three RX channels, although this should be understood only as an example. It is also possible for an MMIC to have a plurality of TX channels. In other examples, an MMIC can even have no TX channels at all (but a plurality of RX channels). In this case, the TX channels can be arranged in a separate transmitter MMIC.

The two MMICs 10 and 11 are synchronized, that is to say that they use the same local oscillator signal $s_{LO}(t)$ (also referred to as LO signal) and also the same system clock signal $s_{CLK}(t)$. The local oscillator signal $s_{LO}(t)$ is generated by an RF oscillator (local oscillator, not illustrated), which can be integrated in one of the MMICs 10 or 11 or else in a further MMIC. In the present example, the local oscillator integrated in the MMIC 10 is used and the local oscillator signal $s_{LO}(t)$ generated thereby is transmitted (inter alia) to the MMIC 11.

In the example illustrated in FIG. 1, the radar system comprises a system controller 50, which can comprise for example a microcontroller, a digital signal processor or some other type of processor. The system controller 50 is configured to control the operation of the MMICs and to process the digital output signals (digital baseband signals, also referred to as digital radar signals) generated by the MMICs in order to detect radar targets (i.e. to calculate the position, speed and azimuth angle thereof). For this purpose, the controller 50 can comprise a computing unit, which can also include the processor mentioned above. However, the computing unit does not necessarily consist only of a processor that is able to execute software instructions. The computing unit can additionally also comprise hardwired computing circuits (hardware accelerators) and also further processors, optionally having a plurality of processor cores. In this description, computing unit is understood to mean any entity composed of hardware, software or a combination thereof which is configured to provide the functions necessary for detecting radar targets.

The communication (data transmission) between the MMICs 10, 11 and the system controller 50 can be effected digitally, for example via one or more digital communication connections. Examples of such a communication connection are SPI (Serial Peripheral Interface), I²C-Bus (Inter-Integrated Circuit Bus), and also high-speed connections such as e.g. MSB (Microsecond Bus), HSSL (High Speed Serial Link) or LVDS (low voltage differential signal) interfaces. In some example embodiments, time-critical signals are transmitted via a high-speed connection and non-time-critical signals are transmitted via slower connections such as e.g. SPI.

Figure 3:
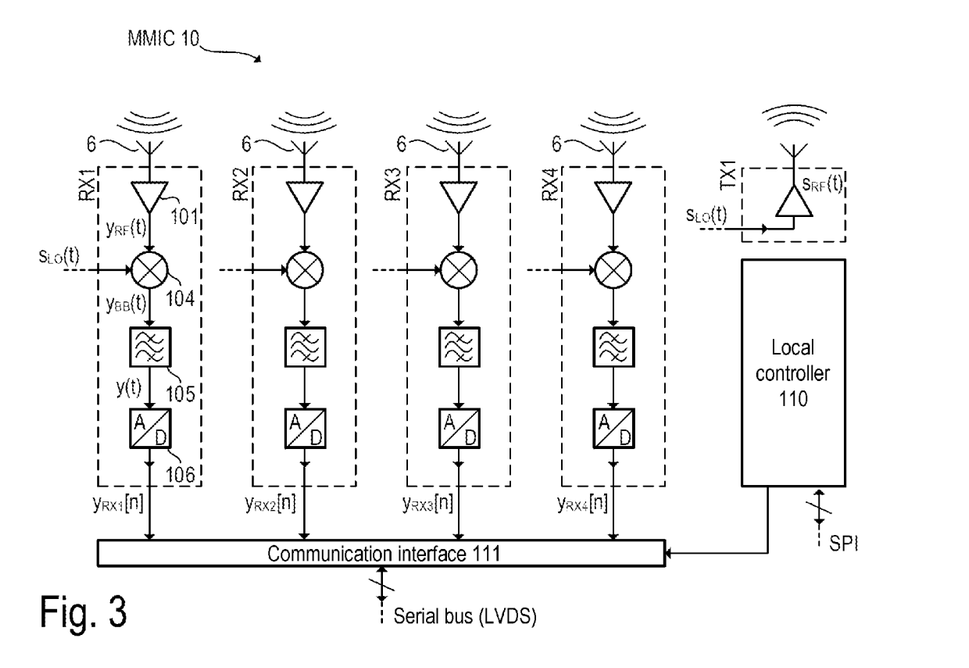
FIG. 3 shows the construction of a radar chip having a plurality of receiving channels based on an example.

FIG. 3 illustrates the construction of a radar MMIC based on a simplified example. In the example illustrated, the MMIC 10 has four receiving channels RX1, RX2, RX3, RX4 and one transmitting channel TX1. It should be noted that when a plurality of transmitting channels are used, so-called virtual channels can be implemented. By way of example, in a system having four physical receiving channels and three physical transmitting channels, twelve virtual channels can be implemented (four each per physical transmitting channel). However, the concept of virtual channels is known per se and therefore will not be elaborated here.

The transmitting channel TX1 substantially includes an RF power amplifier 2 configured to amplify the LO signal $s_{LO}(t)$ fed to the transmitting channel TX1 and to emit it as antenna signal $S_{RF}(t)$ via the antenna 5 coupled to the output port of the transmitting channel TX1. It goes without saying that the present example is simplified and the transmitting channel TX1 can have further circuit components (e.g. configurable phase shifters). For the sake of simplicity, only those components needed to explain the example embodiments and the concepts used by the latter are illustrated. For example, the local oscillator that generates the LO signal $s_{LO}(t)$ is not illustrated either. Said local oscillator, as mentioned, is also not necessarily integrated in the MMIC 10.

The four receiving channels RX1, RX2, RX3 and RX4 are constructed substantially identically. The receiving channel RX1 will be described as representative of all the receiving channels. In accordance with FIG. 3, the receiving channel RX1 has an RF amplifier (e.g. a Low Noise Amplifier, LNA) configured to amplify the RF radar signal received at the antenna port of the receiving channel (which is coupled to a receiving antenna 6). The amplified RF radar signal is designated by $y_{RF}(t)$.

The amplified RF radar signal $y_{RF}(t)$ is fed to a first RF port of a mixer 104. The LO signal $s_{LO}(t)$ is fed to a second RF port of the mixer 104. The mixer 104 substantially carries out a multiplication of the amplified RF radar signal $y_{RF}(t)$ by the LO signal $s_{LO}(t)$, which results in a down-conversion of the amplified RF radar signal $y_{RF}(t)$ from the RF band to baseband. The resulting baseband signal is designated by $y_{BR}(t)$. The baseband signal $y_{BR}(t)$ is fed to an analog signal processing chain 105, which includes a low-pass filter, in particular, in order to suppress undesired sidebands and image frequencies. Furthermore, the signal processing chain 105 can contain a high-pass filter, in order to suppress a DC component (DC offset) of the baseband signal $y_{BB}(t)$, and an amplifier.

The baseband signal preprocessed by the analog signal processing chain 105 is designated by $y(t)$. This signal is digitized by means of an analog-to-digital converter 106 and the resulting digital signal is referred to as a digital radar signal or digital baseband signal $y_{RX1}[n]$, which can also be regarded as an output signal of the receiving channel RX1. As mentioned, the other receiving channels are constructed substantially identically and therefore supply the digital baseband signals $y_{RN2}[n]$, $y_{RX3}[n]$ and $y_{RX4}[n]$. It goes without saying that the present example is simplified and the receiving channel RX1 can have further circuit components in the analog and digital sections (e.g. configurable detectors, filters, decimators, phase shifters, etc.). Components which are known per se to a person skilled in the art and not needed to describe the example embodiments are not depicted in the figures, in order not to complicate the latter unnecessarily.

It should be noted that the mixer 104 can be constructed as a single stage or can contain a plurality of mixer stages, wherein the amplified RF radar signal $y_{RF}(t)$ is converted into an intermediate frequency band in a first mixer stage and into baseband in a further mixer stage. The output signal of the last mixer stage is always referred to as baseband signal $y_{BR}(t)$ here. The mixer 104 can also be a so-called IQ mixer, which supplies two baseband signals, which are referred to as in-phase signal and quadrature signal and can also be regarded as the real part and imaginary part of a complex-valued signal. The use of IQ mixers in radar systems is known per se and therefore will not be discussed any further here. The applicability of the concepts and example embodiments described here does not depend on whether the receiving channels output real or complex-valued (digital) radar signals.

As mentioned, the digital radar signals $y_{RN1}[n]$, $y_{RX2}[n]$, $y_{RX3}[n]$ and $y_{RX4}[n]$ can be transmitted via a communication interface 111 to a computing unit configured to detect radar signals. The transmission can be effected via a serial high-speed connection, for example. It should be mentioned at this juncture that in this example the digital radar signals $y_{RX1}[n]$, $y_{RX2}[n]$, $y_{RN3}[n]$ and $y_{RM4}[n]$ (output signals of the analog-to-digital converters) are transmitted to the computing unit directly via the communication connection mentioned. However, this is not necessarily the case. The MMIC 10 can also contain a digital frontend, in which the digital radar signals $y_{RX1}[n]$, $y_{RX2}[n]$, $y_{RX3}[n]$ and $y_{RM4}[n]$ are preprocessed. By way of example, the digital radar signals $y_{RX1}[n]$, $y_{RX2}[n]$, $y_{RX3}[n]$ and $y_{RX4}[n]$ can be subjected to filtering and/or decimation in the digital frontend. Furthermore, it is possible for a Fourier transformation already to take place in the digital frontend and for the transformed signals to be transmitted via the communication connection. The digital frontend can also be regarded as part of the computing unit mentioned.

The MMIC 10 also contains a local controller 110 configured to control and to coordinate the operation of the circuit components contained in the MMIC 10. The local controller 110 is configured to receive data (e.g. control commands) from the system controller 50 via a communication connection. The communication connection can be an SPI bus, for example. It is also possible for the local controller 110 to use the communication interface 111 for communication with the system controller.

As already mentioned in the introduction, the phases of the baseband signals supplied by the receiving channels RX1, RX2, RX3, RX4 may be important for accurate detection of the radar targets (in particular for a good angular resolution). The circuit components contained in the receiving channels of an MMIC can cause phase shifts. The receiving channels of a radar MMIC, with regard to the phase shift caused by them, behave substantially the same (with regard to temperature drift, aging effects, etc.) because the receiving channels of an MMIC are practically identical in a manner governed by production on account of the integration in the same chip. Two receiving channels integrated in different MMICs (e.g. MMICs 10 and 11, see FIG. 2) can behave differently with regard to the phase shift (e.g. different drift in the case of temperature fluctuations), which can adversely affect the accuracy of the detection of the radar targets. The example shown in FIG. 4 illustrates a concept which makes it possible to identify and compensate for changes of phase shifts that are caused in receiving channels of different MMICs.

Figure 4:
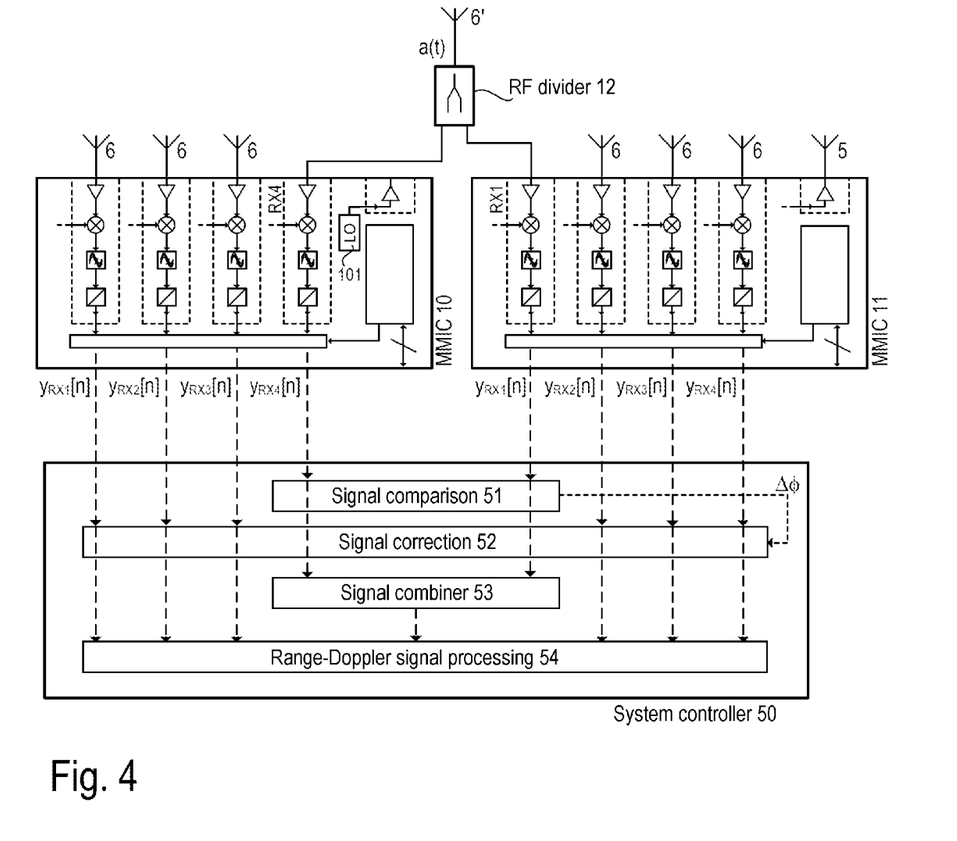
FIG. 4 illustrates one example embodiment of a radar system that is able to monitor phase shifts in two receiving channels integrated in different radar chips and, if appropriate, to balance deviations in the phases.

The radar system shown in FIG. 4 comprises two MMICs 10, 11, each of which can be constructed as in the example from FIG. 3. However, the antenna port of the receiving channel RX4 of the MMIC 10 and the antenna port of the receiving channel RX1 of the MMIC 11 are coupled to the same receiving antenna 6' via the RF power divider 12. That is to say that the antenna 6' is connected to an input port of the power divider 12 and the outputs of the power divider 12 are connected to the antenna ports of the two receiving channels (RX4 in MMIC 10 and RX1 in MMIC 11). The power divider 12 can be e.g. a Wilkinson power divider, which divides the power of the signal received by the antenna 6' into two equal parts. The two receiving channels (RX4 in MMIC 10 and RX1 in MMIC 11) thus "see" the same antenna signal. The transmitting channel TX1 in the MMIC 10 is not used in this example. Only the transmitting channel TX1 in the MMIC 11 is used. It goes without saying that a plurality of transmitting channels can also be used in other examples.

Since both receiving channels (RX4 in MMIC 10 and RX1 in MMIC 11) receive the same RF radar signal $y_{RF}(t)$ via the RF power divider 12, the associated digital radar signals $y_{RX4}[t]$ (output signal of the channel RX4 in MMIC 10) and $y_{RX1}[t]$ (output signal of the channel RX1 in MMIC 11) should—theoretically—be identical and in particular have the same phase. That is only the case, however, if the two receiving channels behave identically. However, since the two receiving channels are integrated in different MMICs, the phases of the associated digital radar signals $y_{RX4}[t]$ and $y_{RX1}[t]$ can deviate from one another and the phase deviation can also vary over the course of time.

Knowledge of the fact that the two receiving channels (RX4 in MMIC 10 and RX1 in MMIC 11) receive the same antenna signal allows, however, for example observation (monitoring) of changes of the phases and compensation of phase deviations. This compensation can be carried out digitally by the computing unit, for example. The observation of changes of other signal parameters (e.g. amplitude) and the compensation of deviations are also possible. A simplified example is illustrated in FIG. 4, wherein the blocks 51-54 represent functional units of the computing unit, which are implemented by means of software, for example. In the function block 51, the digital radar signals $y_{RM4}[t]$ and $y_{RX1}[t]$ of those two receiving channels which process the same antenna signal $a(t)$ are compared. A result of the comparison can be, in particular, a phase deviation $\Delta\phi$ between the two digital radar signals $y_{RX4}[t]$ and $y_{RX1}[t]$. In the function block 52, all or some of the eight digital radar signals ($y_{RX1}[t]$, . . . , $y_{RN4}[t]$ from MMIC 10 and $y_{RX1}[t]$, . . . , $y_{RX4}[t]$ from MMIC 11) can be corrected based on the phase deviation determined by the function block 51. This is based on the assumption/recognition that receiving channels integrated in the same radar chip behave substantially identically (e.g. exhibit the same behavior in the case of a temperature change), whereas two receiving channels (e.g. RX4 in MMIC 10 and RX1 in MMIC 11) from different MMICs generally do not behave identically.

In general, the signal processing block 51 is configured to determine information indicating a deviation between a signal parameter (e.g. phase) of the digital baseband signal $y_{RN4}[n]$ of a first receiving channel (e.g. channel RX4 of the MMIC 10) and the corresponding signal parameter of the digital baseband signal $y_{RX1}[n]$ of the second receiving channel (e.g. channel RX1 of the MMIC 11). In the example explained above, the information determined denotes a phase deviation between the (actually redundant) digital radar signals $y_{RY4}[t]$ and $y_{RX1}[t]$. Additionally, or alternatively, it is also possible to determine deviations in other signal parameters such as e.g. an amplitude deviation or a deviation of the noise floor contained in the signals.

In the function block 53, the digital radar signals $y_{RN4}[t]$ and $y_{RX1}[t]$ based on the same antenna signal are combined, wherein a combination can also include that one of the two signals is selected. The function block 54 then receives the seven corrected digital radar signals (which can respectively be assigned to the seven receiving antennas 6) and applies thereto an algorithm known per se for the detection of radar targets, for example an algorithm that carries out a range-Doppler analysis. The range-Doppler analysis generally yields so-called range-Doppler maps or range-Doppler images in which radar targets can be detected directly (e.g. by means of threshold value comparison, CFAR algorithms, etc.).

It should be mentioned that the concept described herein can be used not only for correcting phase deviations (or for balancing the phases) in the case of receiving channels in different MMICs, but also for monitoring the phases during the operation of the radar sensor. If the observed phase deviation varies to an excessively great extent, it may indicate possibly unreliable measurements, and a recalibration can be initiated. A very great variation can also indicate a defect of the radar system.

Figure 5:
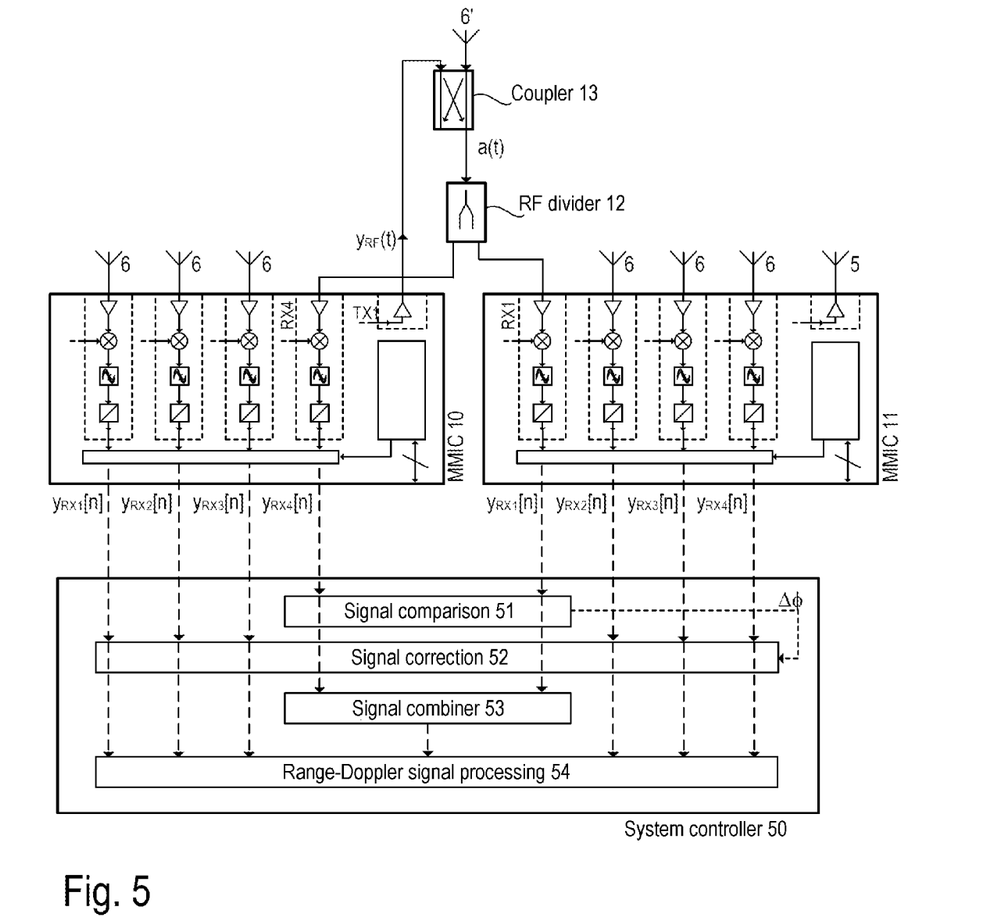
FIG. 5 illustrates an example of an extension/modification of the example from FIG. 4.

FIG. 5 illustrates a further example embodiment, which can be regarded as an alternative or extension of the example from FIG. 4. The example from FIG. 5 is substantially the same as the previous example from FIG. 4. The system from FIG. 5 additionally comprises a coupler 13 connected between the antenna 6' and the input of the power divider 12. The coupler 13 is configured to forward the antenna signal received by the antenna 6' and (additionally or alternatively) an RF test signal $y_{RF}(t)$ to the power divider 12.

The RF test signal $y_{RF}(t)$ can be provided by the transmitting channel TX1 in the MMIC 10, for example. However, that is not necessarily the case. In other example embodiments, the RF test signal $y_{RF}(t)$ can also be provided by some other signal source. In the example from FIG. 4, the transmitting channel TX1 of the MMIC 10 generates the RF test signal $y_{RF}(t)$ based on an oscillator signal of an RF oscillator (not illustrated) integrated in the MMIC 10. For the rest, the example from FIG. 5 functions the same as the previous example from FIG. 4; the RF test signal $y_{RF}(t)$ can be regarded as a "simulated" antenna signal. The frequency of the RF test signal $y_{RF}(t)$ can be controlled and set by the system controller 50.

Figure 6:
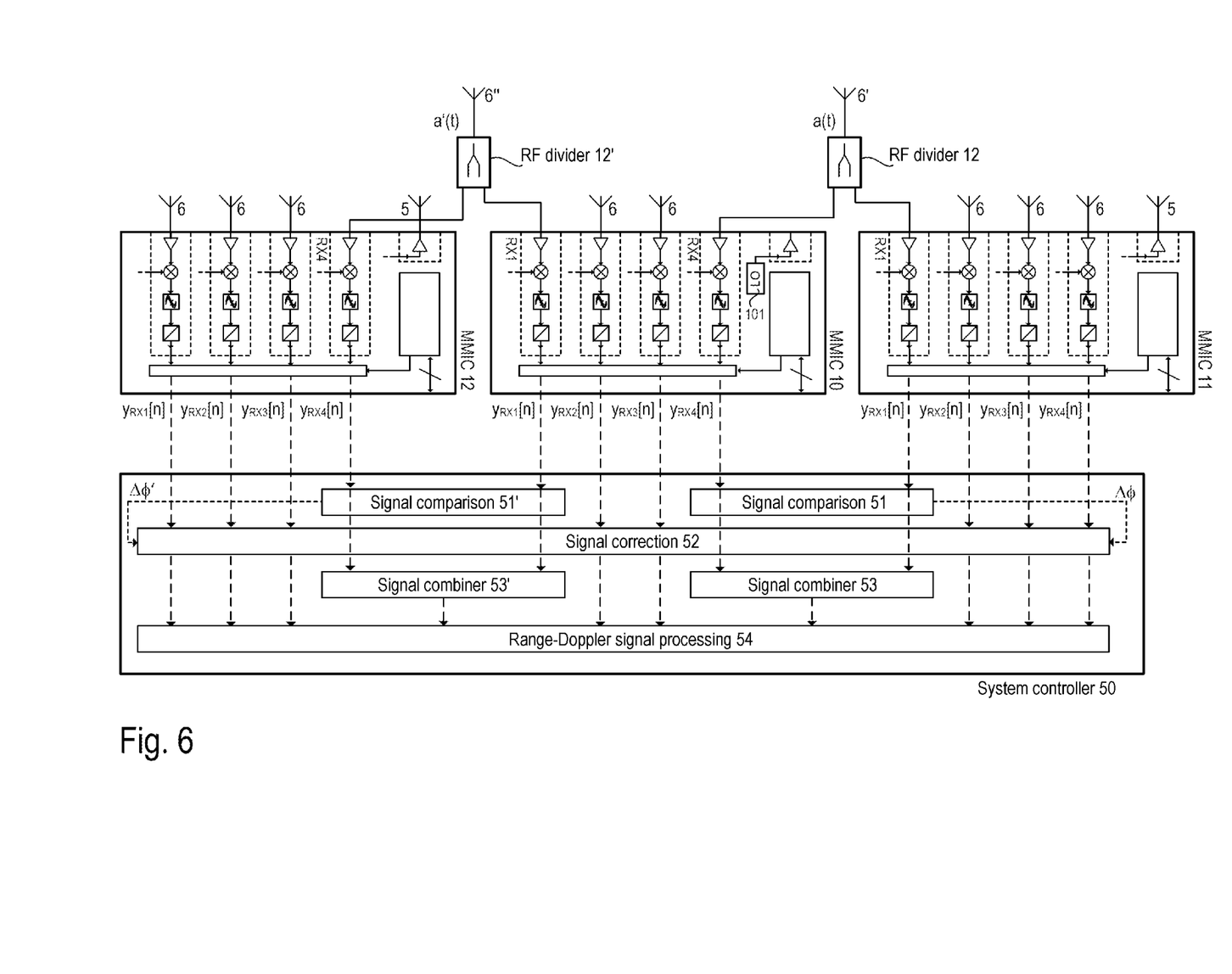
FIG. 6 shows the example from FIG. 4, but with three radar chips.

The example from FIG. 6 is substantially an extension of the system from FIG. 4 to a system having three radar chips/MMICs 10, 11, 12. As in the previous examples, the receiving channel RX4 of the MMIC 10 and the receiving channel RX1 of the MMIC 11 "see" the same input signal a(t) from the RF power divider 12 (antenna signal of the antenna 6'). In addition, the receiving channel RX4 of the MMIC 12 and the receiving channel RX1 of the MMIC 10 receive the same input signal a'(t) from the RF power divider 12' (antenna signal of the antenna 6").

The signal processing blocks 51' and 53' can implement substantially the same functions as the blocks 51 and 53, respectively. By way of example, the result of the comparison carried out by block 51' can be, in particular, a phase deviation $\Delta\phi'$ between the two digital radar signals $y_{RX4}[t]$ (from MMIC 12) and $y_{RX1}[t]$ (from MMIC 10). As mentioned, additionally or alternatively, it is also possible to determine deviations in other signal parameters such as e.g. an amplitude deviation or a deviation of the noise floor contained in the signals. The signal processing block 52 is configured to modify one or more of the digital baseband signals $y_{RX1}[n]$, $y_{RX2}[n]$, etc. of the MMICs 10, 11 and 12 based on the determined information about the deviations established in the blocks 51 and 51'. The modification can be effected e.g. such that the phase deviations and/or the amplitude deviations in the redundant receiving channels are balanced (phase/amplitude balancing). The signal processing block 53', in the same way as the signal processing block 53, combines in each case two redundant baseband signals into one baseband signal. The signal processing block 54 is configured to carry out a range-Doppler analysis for the ten baseband signals illustrated in FIG. 6 and to detect radar targets on the basis thereof.

Figure 7:
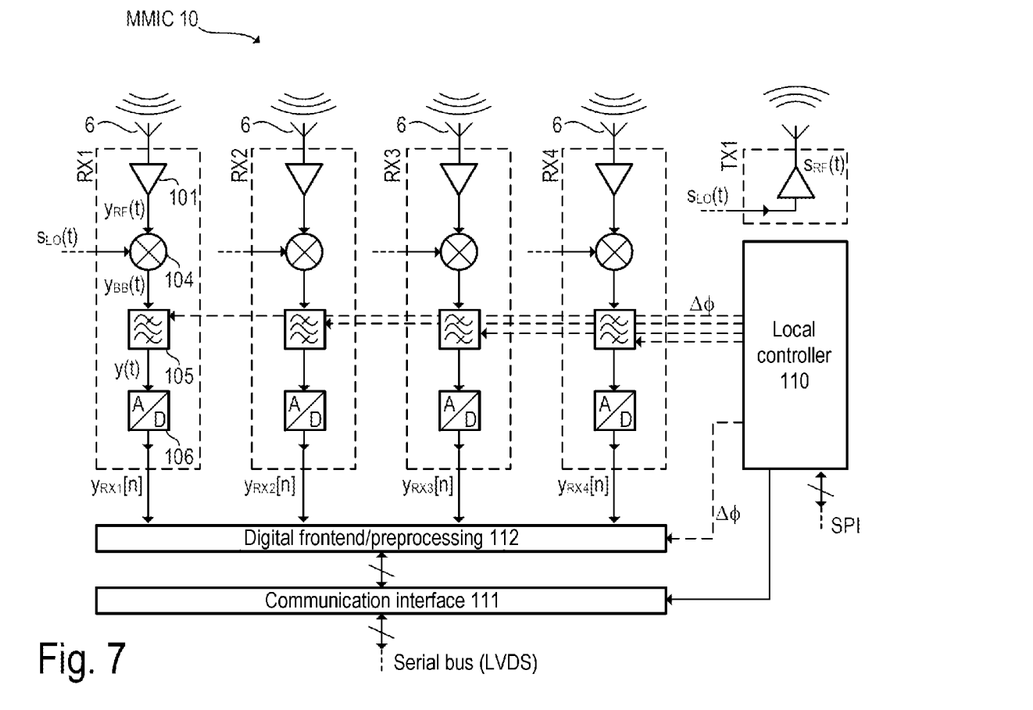
FIGS. 7, 8, and 9 illustrate further examples based on the concept from FIG. 4.

FIG. 7 shows a modification/extension of the example from FIG. 3. FIG. 3 and FIG. 7 are substantially identical with the difference that the MMIC 10 in accordance with FIG. 7 has the ability to modify the phases of the digital radar signals $y_{RX1}[t]$, $y_{R42}[t]$, $y_{R43}[t]$, and $y_{RX4}[t]$. In accordance with the example illustrated, the local controller 110 of the MMIC 10 is configured to control the analog signal processing chains 105 in the receiving channels RX1, RX2, RX3, RX4 such that one or more signal parameters (e.g. phase, amplitude) of the respective digital radar signals $y_{RX1}[t]$, $y_{RY2}[t]$, $y_{RX3}[t]$, and $y_{RX4}[t]$ (baseband signals) are modified. In particular, in this way, based on the previously determined information about possible deviations in the signal parameters, the transfer response of the analog signal processing chains 105 can be controlled/adapted such that the deviations mentioned are (at least partly) compensated for. In order to modify for example the phase of the respective digital radar signals $y_{RX1}[t]$, $y_{RX2}[t]$, $y_{R43}[t]$, and $y_{RN4}[t]$, it is possible to adapt e.g. the transfer response (e.g. by means of phase shifters) of the analog signal processing chains 105, such that the phase shift caused by the respective analog signal processing chains 105 changes.

Figure 8:
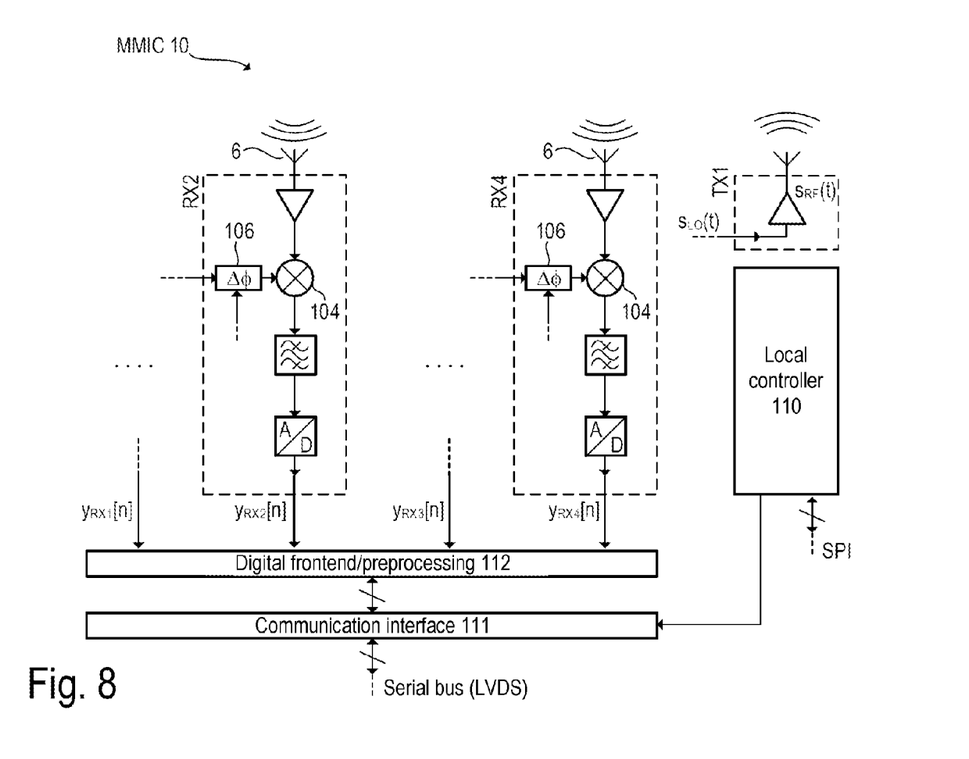

Additionally, or alternatively, the abovementioned signal parameters (e.g. phase, amplitude) can also be modified digitally in the digital frontend 112. The example from FIG. 8 illustrates a further possibility of altering signal parameters—in particular the phase—of the digital radar signals $y_{RX1}[t]$, $y_{RY2}[t]$, $y_{R43}[t]$, and $y_{RX4}[t]$. Accordingly, the local oscillator signal $s_{LO}(t)$ used by the mixers 104 for mixing the respective RF input signals is phase-shifted by means of a phase shifter 106 connected upstream of the mixer. This phase shift of the local oscillator signal $s_{LO}(t)$ results directly in a corresponding phase shift of the respective digital radar signal $y_{RX1}[t]$, $y_{RY2}[t]$, $y_{RX3}[t]$, and $y_{RX4}[t]$.

Figure 9:
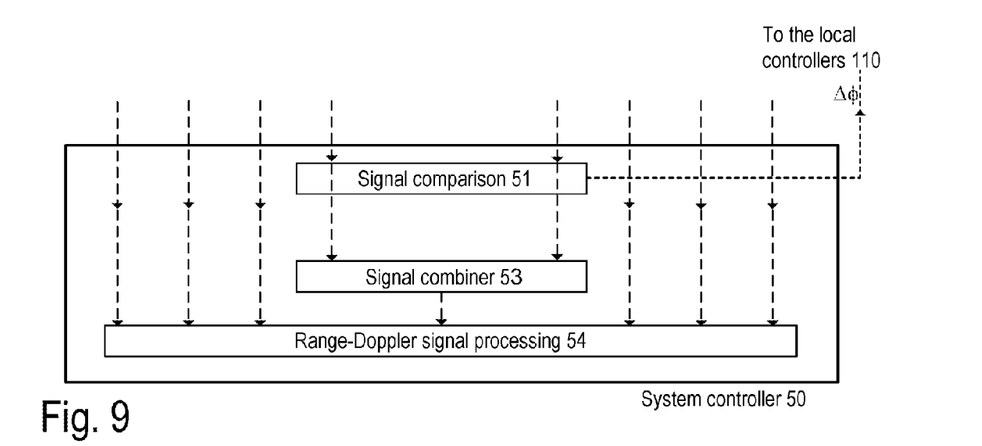

If—as in the examples from FIGS. 7 and 8—the compensation/balancing of deviations in the signal parameters is effected in the MMICs 10 and 11 (e.g. in the analog baseband signal processing chain 105 of the receiving channels or the digital frontends connected downstream), then the signal correction by the computing unit can be omitted. This situation is illustrated in FIG. 9. In this example embodiment, the computing unit (which is contained in the system controller 50 in this example) now only has the function block 51, which, as explained above, compares two signals from different MMICs in order to determine deviations in specific signal parameters. The information about the deviations determined can be transmitted to the local controllers 110 contained in the individual MMICs 10, 11 (cf. FIG. 7), for example via an SPI communication connection. The modification of the digital radar signals for the purpose of balancing deviating signal parameters then takes place in the individual MMICs, as was described above with reference to FIGS. 7 and 8.

Figure 10:
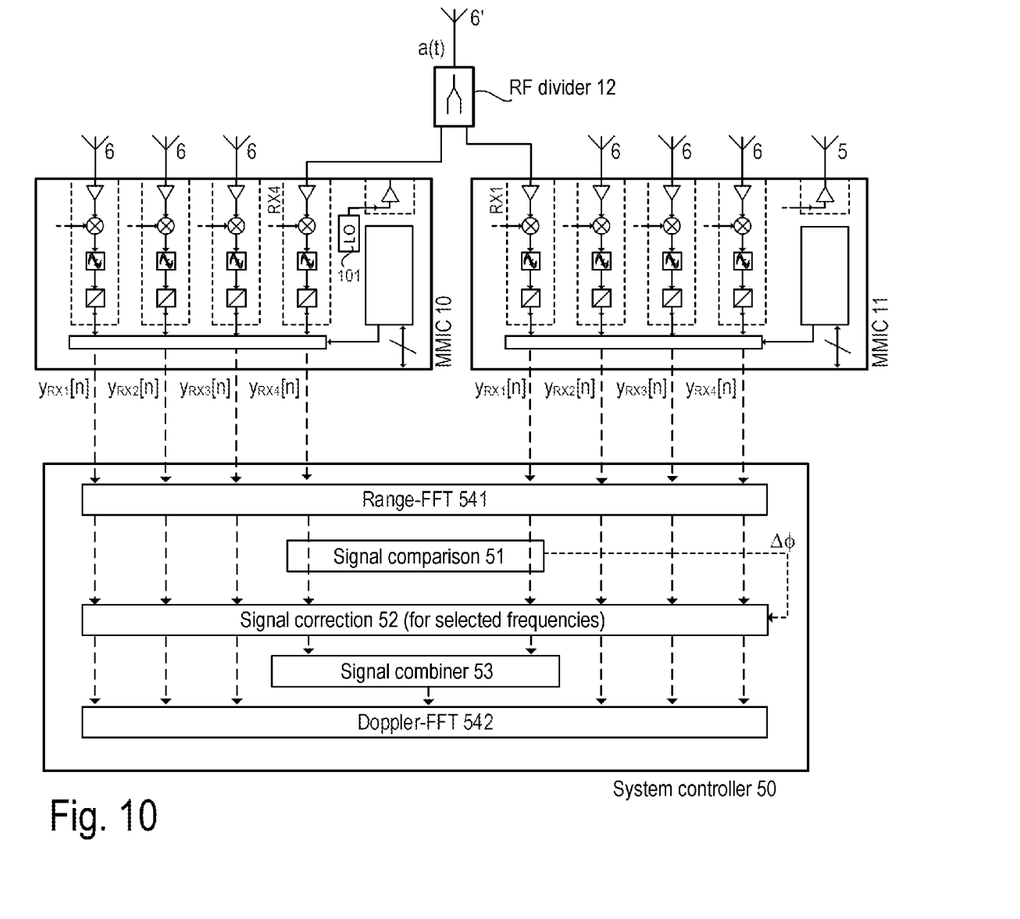
FIG. 10 illustrates an example similar to that in FIG. 4, but with digital signal processing implemented differently.

The example from FIG. 10 differs from the example from FIG. 4 merely in the digital signal processing carried out by the computing unit. In this case, the signal correction (signal processing block 52) is not effected before the range-Doppler analysis (block 54 in FIG. 4), but rather after a first part of the range-Doppler analysis, namely after the calculation of the range-FFT (signal processing block 541 in FIG. 10). Afterward, the signals are compared in the frequency domain (block 51) and—based on the comparison result—the signals are modified/corrected (block 52). This modification/correction can be carried out for individual, selected frequencies, in particular for frequencies which potentially indicate radar targets. Afterward, the inherently redundant signals can be combined (block 53) and the Doppler-FFT (block 542) can be carried out. As in the previous examples, the Doppler-FFT yields the so-called range-Doppler images which can be used for detecting radar targets.

In a further embodiment, signal comparison (block 51), correction (block 52) and combination (block 53) can also be effected directly in the range-Doppler map. In the example from FIG. 10, the Doppler-FFT 542 would then directly follow the range-FFT 541, and comparison (block 51), correction (block 52) and combination (block 53) would be carried out in the Doppler map.

Figure 11:
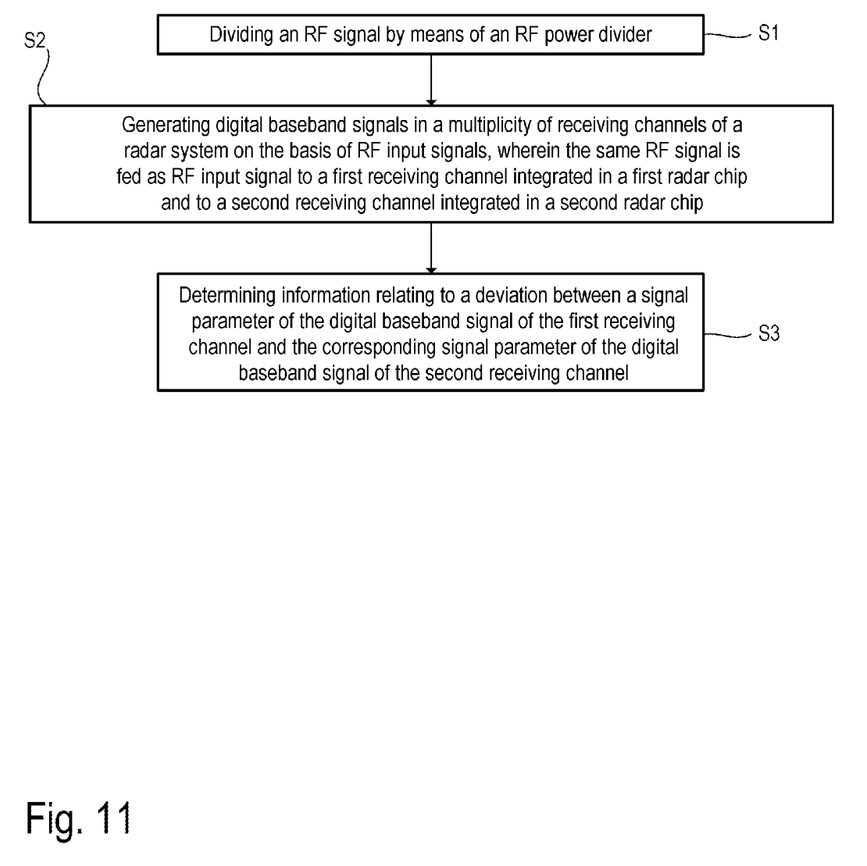
FIG. 11 is a flow diagram for illustrating one example embodiment of a method for a radar system having a plurality of MMICs.

FIG. 11 is a flow diagram for illustrating one example embodiment of a method which uses the concepts described here. In accordance with FIG. 11, an RF signal (e.g. the antenna signal of the antenna 6', cf. FIG. 4) is divided by means of an RF power divider (step S1). The method furthermore comprises generating digital baseband signals in a multiplicity of receiving channels of a radar system based on RF input signals fed to the input ports of the receiving channels (step S2). The receiving channels are integrated in two or more radar chips/MMICs, wherein the same RF signal is fed as RF input signal (via the power divider) to a first receiving channel integrated in a first MMIC and to a second receiving channel integrated in a second MMIC. The method furthermore comprises determining information relating to a deviation between a signal parameter (e.g. phase, amplitude, noise floor) of the digital baseband signal of the first receiving channel and a corresponding signal parameter of the digital baseband signal of the second receiving channel (step S3).

Theoretically, there should be no deviation, since, after all, the digital baseband signals of the first and second receiving channels are based on the same RF input signal (divided by the power divider). The determined information about the deviation—practically always present—can be used to monitor the radar system and to evaluate the reliability and accuracy of the radar measurements. Furthermore, the information determined can also be used to correct the corresponding signal parameters of the baseband signals supplied by the receiving channels or to balance them with respect to one another (balancing). In this way, for example the phase shifts caused in the receiving channels of the individual MMICs can be balanced with respect to one another and, in particular, "divergence" of the phases can be prevented. The concepts presented here thus enable a calibration of the phase differences of the baseband signals supplied by receiving channels in different MMICs.

What is claimed is:

1. A radar system, comprising:
a power divider configured to forward a first radio frequency (RF) signal;
a first radar chip comprising a plurality of first receiving channels comprising first RF input ports,
wherein only a single first receiving channel, of the plurality of first receiving channels, is configured to provide, based on the first RF signal, a first digital baseband signal associated with a first phase, and
wherein another first receiving channel, of the plurality of first receiving channels and different from the single first receiving channel, is configured to provide, based on a second RF signal, a second digital baseband signal;
a second radar chip comprising a plurality of second receiving channels comprising second RF input ports,
wherein only a single second receiving channel, of the plurality of second receiving channels, is configured to provide, based on the first RF signal, a third digital baseband signal associated with a second phase, and
wherein another second receiving channel, of the plurality of second receiving channels and different from the single second receiving channel, is configured to provide, based on a third RF signal, a fourth digital baseband signal,
wherein the first digital baseband signal, the second digital baseband signal, the third digital baseband signal, and the fourth digital baseband signal are different from each other; and
at least one processor configured to:
receive the first digital baseband signal, the third digital baseband signal, and at least one of the second digital baseband signal or the fourth digital baseband signal,
determine information indicative of a deviation between the first phase, associated with the first digital baseband signal, and the second phase, associated with the third digital baseband signal, and
modify, based on the information indicative of the deviation, at least one of the second digital baseband signal or the fourth digital baseband signal.

2. The radar system as claimed in claim 1, wherein the second digital baseband signal and the fourth digital baseband signal are each modified based on the information indicative of the deviation.

3. The radar system as claimed in claim 1, further comprising:
a plurality of receiving antennas coupled to the first RF input ports and the second RF input ports,
wherein a first receiving antenna of the plurality of receiving antennas is coupled both to the single first receiving channel and to the single second receiving channel via the power divider.

4. The radar system as claimed in claim 3, further comprising:
a transmitting channel, integrated in the first radar chip, configured to output an RF output signal at an RF output port of the transmitting channel, wherein the RF output port is coupled to an input of the power divider.

5. The radar system as claimed in claim 4, further comprising:
a coupler, coupled to the first receiving antenna and the RF output port of the transmitting channel, configured to feed both the RF output signal and an antenna signal, supplied by the first receiving antenna, as an RF signal to the power divider.

6. The radar system as claimed in claim 1, wherein the first radar chip further comprises a local oscillator configured to generate a local oscillator signal, and
wherein the local oscillator is coupled to the plurality of first receiving channels and the plurality of second receiving channels, and
wherein the plurality of receiving channels and the second plurality of receiving channels are configured to mix a respective RF signal, received at a respective RF input port, with the local oscillator signal.

7. The radar system as claimed in claim 1, wherein the at least one processor is at least partly integrated in a semiconductor chip connected to the first radar chip and the second radar chip via a communication connection, via which information relating to the first digital baseband signal, the third digital baseband signal, and the at least one of the second digital baseband signal or the fourth digital baseband signal is transmitted.

8. The radar system as claimed in claim 7, wherein the first radar chip and the second radar chip each includes a digital frontend configured to digitally preprocess the first digital baseband signal, the third digital baseband signal, and the at least one of the second digital baseband signal or the fourth digital baseband signal before transmission via the communication connection.

9. The radar system as claimed in claim 1, wherein the first radar chip and the second radar chip are configured to operate in parallel with each other.

10. A method, comprising:
forwarding a radio frequency (RF) signal to only:
a first receiving channel of a plurality of first receiving channels of a first radar chip, and
a second receiving channel of a plurality of second receiving channels of a second radar chip;
generating first digital baseband signals in the plurality of first receiving channels based on first RF signals, including the RF signal, fed to first RF input ports of the plurality of first receiving channels;
generating second digital baseband signals in the plurality of second receiving channels based on second RF signals, including the RF signal, fed to second RF input ports of the plurality of second receiving channels;
determining information relating to a deviation between a first phase, associated with a first digital baseband signal of the first digital baseband signals, and a second phase, associated with a second digital baseband signal of the second digital baseband signals,
wherein the first digital baseband signal and the second digital baseband signal are each determined based on the RF signal; and
modifying, based on the information relating to the deviation, at least one of:
a third digital baseband signal, associated with a first RF signal of the first RF signals and different from the RF signal, fed to another first receiving channel of the plurality of first receiving channels, or
a fourth digital baseband signal, associated with a second RF signal of the second RF signals and different from the RF signal, fed to another second receiving channel of the plurality of second receiving channels.

11. The method as claimed in claim 10, further comprising:
dividing the RF signal via an RF power divider,
wherein the divided RF signal is forwarded to the first receiving channel and the second receiving channel.

12. The method as claimed in claim 10, further comprising:
transforming the first digital baseband signal and the second digital baseband signal into a frequency domain; and
determining the first phase at a specific frequency of the first digital baseband signal and the second phase at the specific frequency of the second digital baseband signal,
wherein determining information relating to the deviation comprises ascertaining the deviation in the first phase and the second phase.

13. The method as claimed in claim 10, wherein the third digital baseband signal and the fourth digital baseband signal are each modified based on the information relating to the deviation.

14. The method as claimed in claim 10, wherein modifying the at least one the third digital baseband signal or the fourth digital baseband signal comprises:
adapting, based on the information relating to the deviation, at least one of a third phase, associated with the third digital baseband signal, or a fourth phase, associated with the fourth digital baseband signal.

15. The method as claimed in claim 10, wherein determining information relating to the deviation is carried out by at least one processor which is integrated in a semiconductor chip and which is connected to the first radar chip and the second radar chip via a digital communication connection.

16. A radar system, comprising:
a first radar chip comprising a plurality of first receiving channels comprising first radio frequency (RF) input ports,
wherein only a single first receiving channel, of the plurality of first receiving channels, is configured to provide, based on a first RF signal, a first digital baseband signal associated with a first phase;
a second radar chip comprising a plurality of second receiving channels comprising second RF input ports,
wherein only a single second receiving channel, of the plurality of second receiving channels, is configured to provide, based on the first RF signal, a second digital baseband signal associated with a second phase; and
at least one processor configured to:
receive the first digital baseband signal, the second digital baseband signal, and at least one of a third digital baseband signal or a fourth digital baseband signal,
wherein at least one of:
the third digital baseband signal is associated with a second RF signal and another first receiving channel of the plurality of first receiving channels, or
the fourth digital baseband signal is associated with a third RF signal and another second receiving channel of the plurality of second receiving channels, and
determine information indicative of a deviation between the first phase, associated with the first digital baseband signal, and the second phase, associated with the second digital baseband signal; and modify, based on the information indicative of the deviation, the at least one of the third digital baseband signal or the fourth digital baseband signal.

17. The radar system as claimed in claim 16, wherein the first radar chip and the second radar chip are configured to operate in parallel with each other.

18. The radar system as claimed in claim 16, further comprising:
   a plurality of receiving antennas coupled to the first RF input ports and the second RF input ports,
      wherein a single receiving antenna of the plurality of receiving antennas is coupled both to the single first receiving channel and to the single second receiving channel via a power divider.

19. The radar system as claimed in claim 16, wherein the third digital baseband signal and the fourth digital baseband signal are each modified based on the information indicative of the deviation.

20. The radar system of claim 16, wherein the at least one processor is at least partly integrated in a semiconductor chip connected to the first radar chip and the second radar chip via a communication connection, via which information relating to the first digital baseband signal, the second digital baseband signal, and the at least one of the third digital baseband signal or the fourth digital baseband signal is transmitted.

* * * * *

UNITED STATES PATENT AND TRADEMARK OFFICE
CERTIFICATE OF CORRECTION

PATENT NO. : 12,066,565 B2
APPLICATION NO. : 17/223742
DATED : August 20, 2024
INVENTOR(S) : Stefan Helmut Schmalzl Page 1 of 1

It is certified that error appears in the above-identified patent and that said Letters Patent is hereby corrected as shown below:

In the Claims

Claim 6
Column 11, Line 16, change "wherein the plurality of receiving channels and the second" to --wherein the first plurality of receiving channels and the second--

Signed and Sealed this
Twenty-second Day of April, 2025

Coke Morgan Stewart
*Acting Director of the United States Patent and Trademark Office*